(12) United States Patent
Brak et al.

(10) Patent No.: US 11,611,882 B2
(45) Date of Patent: Mar. 21, 2023

(54) AUTOMATICALLY INTEGRATING SECURITY POLICY IN MOBILE APPLICATIONS AT BUILD-TIME

(71) Applicant: Salesforce.com, Inc., San Francisco, CA (US)

(72) Inventors: Claudia Brak, San Francisco, CA (US); Steven Bruce Holly, Laguna Niguel, CA (US); Brian Simmons, San Francisco, CA (US); Bing Ge, San Francisco, CA (US); Jayal Mehta, San Francisco, CA (US); Urvin Thakkar, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 261 days.

(21) Appl. No.: 16/892,128

(22) Filed: Jun. 3, 2020

(65) Prior Publication Data

US 2021/0385647 A1   Dec. 9, 2021

(51) Int. Cl.
*H04W 12/37* (2021.01)
*G06F 8/30* (2018.01)
*G06Q 30/016* (2023.01)
*G06Q 10/107* (2023.01)
*G06F 8/60* (2018.01)

(52) U.S. Cl.
CPC ............. *H04W 12/37* (2021.01); *G06F 8/30* (2013.01); *G06F 8/60* (2013.01); *G06Q 10/107* (2013.01); *G06Q 30/016* (2013.01)

(58) Field of Classification Search
CPC ......... H04W 12/37; H04W 12/12; G06F 8/30; G06F 8/60; G06F 21/57; G06Q 10/107; G06Q 30/016; H04L 63/0272
See application file for complete search history.

(56) References Cited

U.S. PATENT DOCUMENTS

| 9,645,868 B2 * | 5/2017 | Nandakumar ...... G06F 9/44526 |
| 2014/0007048 A1 * | 1/2014 | Qureshi ............... H04L 9/0891 |
| | | 717/110 |
| 2014/0298403 A1 * | 10/2014 | Qureshi ............. H04L 43/0817 |
| | | 726/1 |
| 2015/0007259 A1 * | 1/2015 | Peterson ............... H04W 12/37 |
| | | 726/1 |
| 2017/0017562 A1 * | 1/2017 | Gulkis .................... H04W 4/60 |
| 2017/0085591 A1 * | 3/2017 | Ganda ................... H04W 12/08 |
| 2020/0097264 A1 | 3/2020 | Holly et al. |
| 2021/0385647 A1 * | 12/2021 | Brak ........................ G06F 8/30 |

FOREIGN PATENT DOCUMENTS

| CA | 3056282 A1 | 3/2020 |
| EP | 3627312 A1 | 3/2020 |
| JP | 2020053050 A | 4/2020 |

* cited by examiner

*Primary Examiner* — Shirley X Zhang
(74) *Attorney, Agent, or Firm* — Kwan & Olynick LLP

(57) ABSTRACT

A mobile application development environment may be maintained in association with a computing platform. A request to produce a first mobile application with a first security policy may be processed. The first mobile application may be automatically produced. The first security policy may be integrated with the first mobile application during creation of the first mobile application. The first mobile application may be provided to a mobile application provider. The first security policy may be included in the first mobile application when the first mobile application is downloaded from the mobile application provider.

21 Claims, 9 Drawing Sheets

SETUP
Mobile Publisher

400 ▲    ⟵ 408  Create New App test
✦ Powered by Lightning Communities  ⟵ 404(a)

| PLATFORM | APP STORE STATUS | MYSALESFORCE STATUS | MORE INFO | |
|---|---|---|---|---|
| | | | | Delete |
| iOS | Draft | 4) Submit App or Make Changes | | Continue |
| Android | Draft | Fill In App Information | | Continue |

Selenium Sample-Salesforce App  ⟵ 404(b)
☐ Powered by the Salesforce App

| PLATFORM | APP STORE STATUS | MYSALESFORCE STATUS | MORE INFO | |
|---|---|---|---|---|
| | | | | Delete |
| iOS | Draft | 3) Request Beta App | Your beta app is coming soon | Continue |
| Android | Draft | 3) Request Beta App | Your beta app is coming soon | Continue |

Selenium Sample-Communities  ⟵ 404(c)
✦ Powered by Lightning Communities

| PLATFORM | APP STORE STATUS | MYSALESFORCE STATUS | MORE INFO | |
|---|---|---|---|---|
| | | | | Delete |
| iOS | Draft | 2) Install Managed Package | | Continue |
| Android | Draft | Fill In App Information | ⚠ Something went wrong. Click 'Continue' to learn more. | Continue |

\> Resources

Figure 4

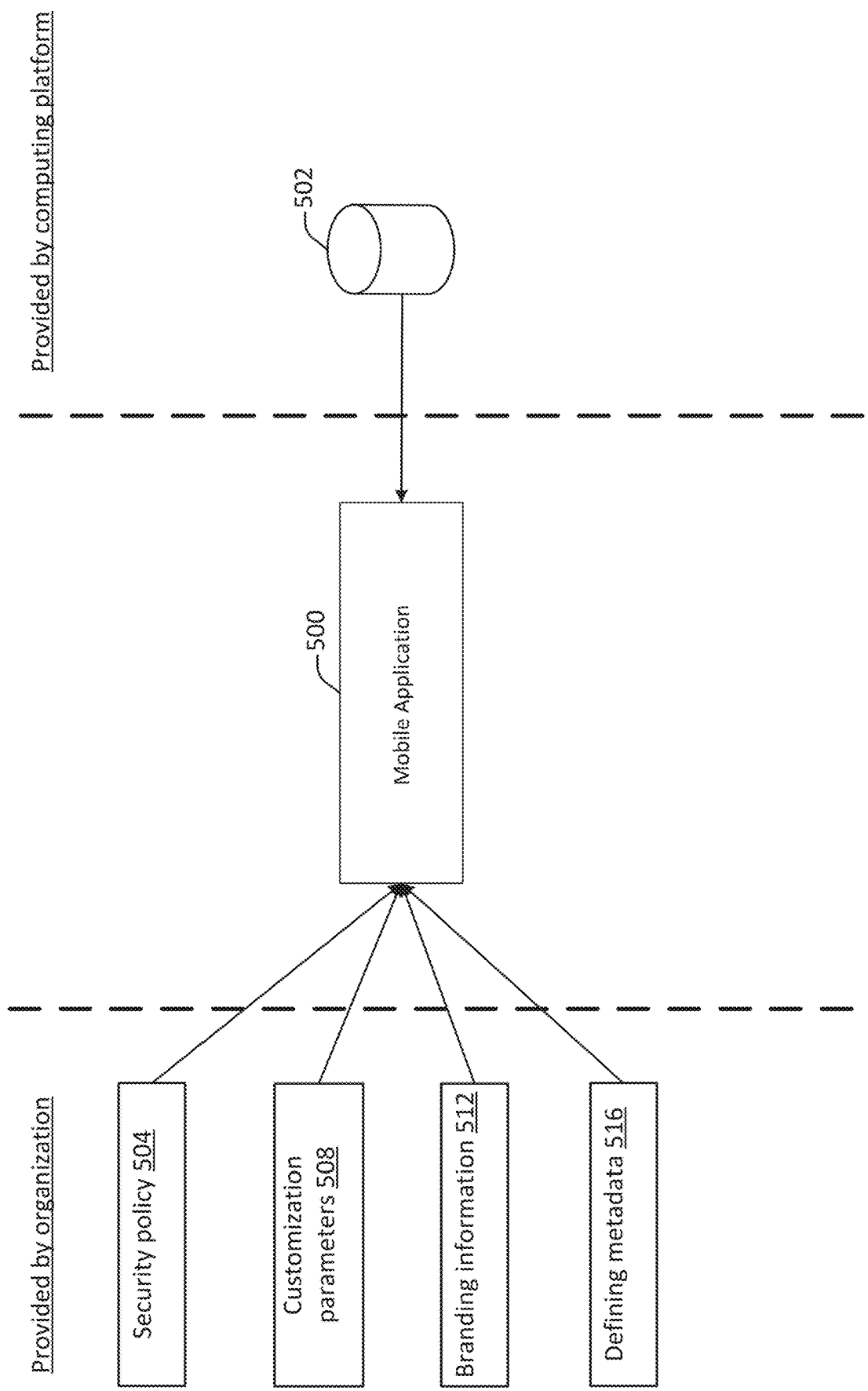

AUTOMATICALLY INTEGRATING SECURITY POLICY IN MOBILE APPLICATIONS AT BUILD-TIME

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever

FIELD OF TECHNOLOGY

This patent document relates generally to mobile applications and more specifically to integrating security policy with mobile applications.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks in association with production of mobile applications.

BRIEF DESCRIPTION OF THE DRAWINGS

The included drawings are for illustrative purposes and serve only to provide examples of possible structures and operations for the disclosed inventive systems, apparatus, methods and computer program products for automatically integrating security policy in mobile applications at build-time. These drawings in no way limit any changes in form and detail that may be made by one skilled in the art without departing from the spirit and scope of the disclosed implementations.

FIG. 4 shows an example of a GUI, in accordance with some implementations.

FIG. 5 shows a block diagram of an example of mobile application production during build time, in accordance with some implementations.

DETAILED DESCRIPTION

Figure 1:
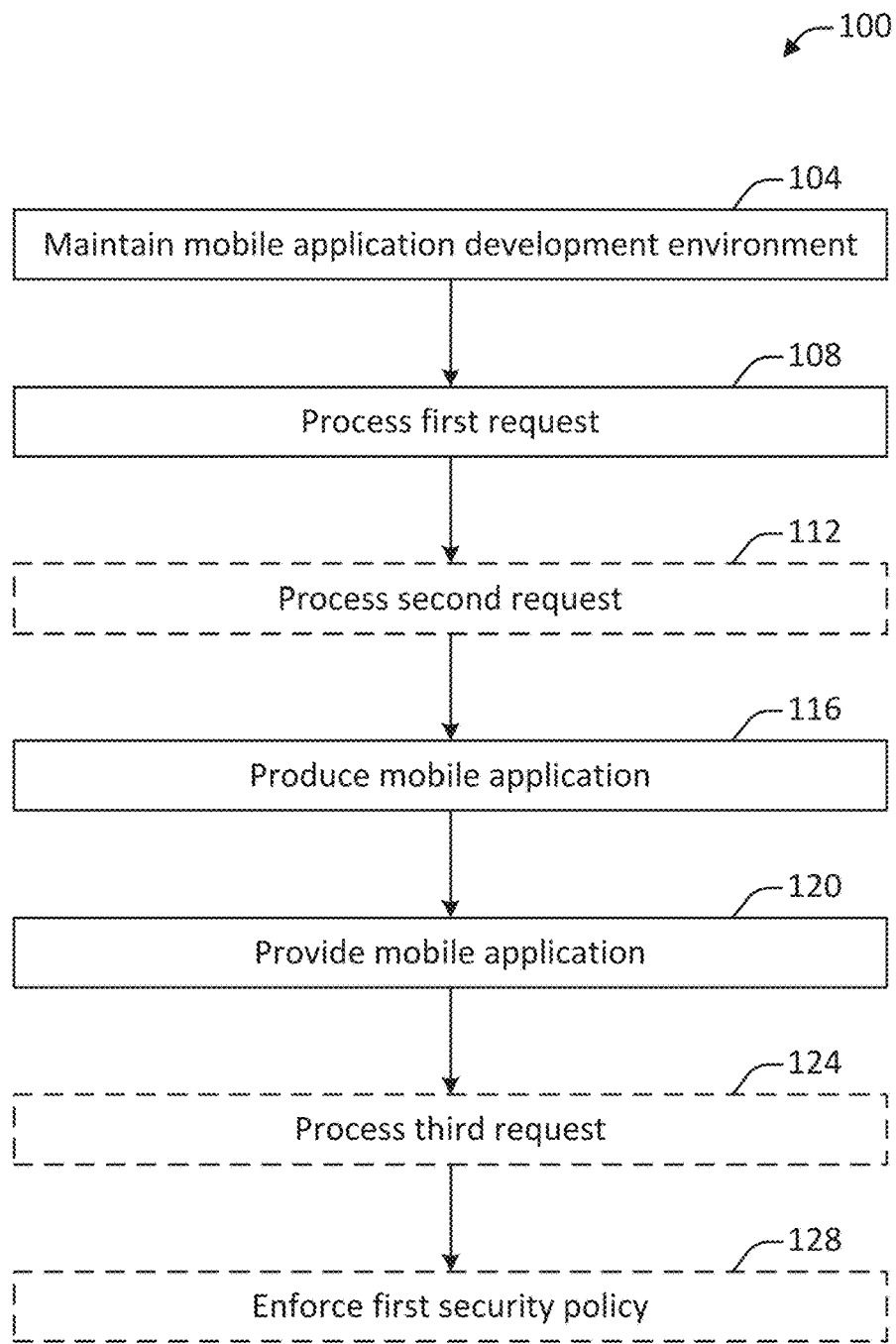
FIG. 1 shows a flowchart of an example of a method for automatically integrating security policy in mobile applications at build-time, in accordance with some implementations.

Some implementations of the disclosed systems, apparatus, methods and computer program products are configured automatically integrating security policy in a mobile application at build-time (e.g., during creation of the mobile application.) As described in further detail below, the disclosed techniques may be implemented alone or in association with any type of computing platform such as a Customer Relationship Management (CRM) Platform, a social networking system, any type of consumer or business software, etc. While CRM platforms (such as those provided by Salesforce.com®, inc.) are discussed herein as an example of such a computing platform, one having skill in the art can appreciate that the examples of computing platforms described herein may be substituted for any suitable computing platform such as those described above.

Traditionally, cloud-based mobile applications complete an initial communication with a server system to obtain a security policy. Unfortunately, this initial communication leads to vulnerability if an unsecure device completes the initial communication with the server. By way of illustration, Edmond is an employee of Mansfield Bank. Edmond uses the Mansfield Bank mobile application for much of his work. Unfortunately, Edmond is using an unsecure device to access the Mansfield Bank mobile application, and this communication has been compromised by Henry. Mansfield Bank uses traditional mobile application management (MAM) techniques whereby an administrator has simply specified a security policy that is stored on a server implementing the Mansfield Bank mobile application. The security policy prohibits unsecure devices, such as Edmond's device, from accessing the Mansfield Bank mobile application. Although the server ultimately rejects Edmond's device at login because of the security policy violation, Edmond's initial communication in which his device sent his login credentials to the server was sufficient to give Henry unauthorized access to the server. As a result, Henry is able to access sensitive information, putting Mansfield Bank's customers and employees at risk.

Alternatively, the disclosed techniques can be implemented to mitigate the vulnerability described above. For instance, in some implementations, instead of initiating security policies stored on a server at runtime, the disclosed techniques integrate security policy generation and initiation with mobile app production such that a security policy may be enforced even prior to user identification. Returning to the above example, using the disclosed techniques, a security policy preventing use of unsecure devices may be integrated into the Mansfield Bank mobile application during production of the Mansfield Bank mobile application. Consequently, when Edmond tries to initiate the Mansfield Bank mobile application on his unsecure device, the security policy can be immediately enforced, preventing the Mansfield Bank mobile application from running and preventing Edmond's unsecure device from communicating with the server. Therefore, the disclosed techniques mitigate the previously-described threat of Henry accessing the server.

Figure 2:
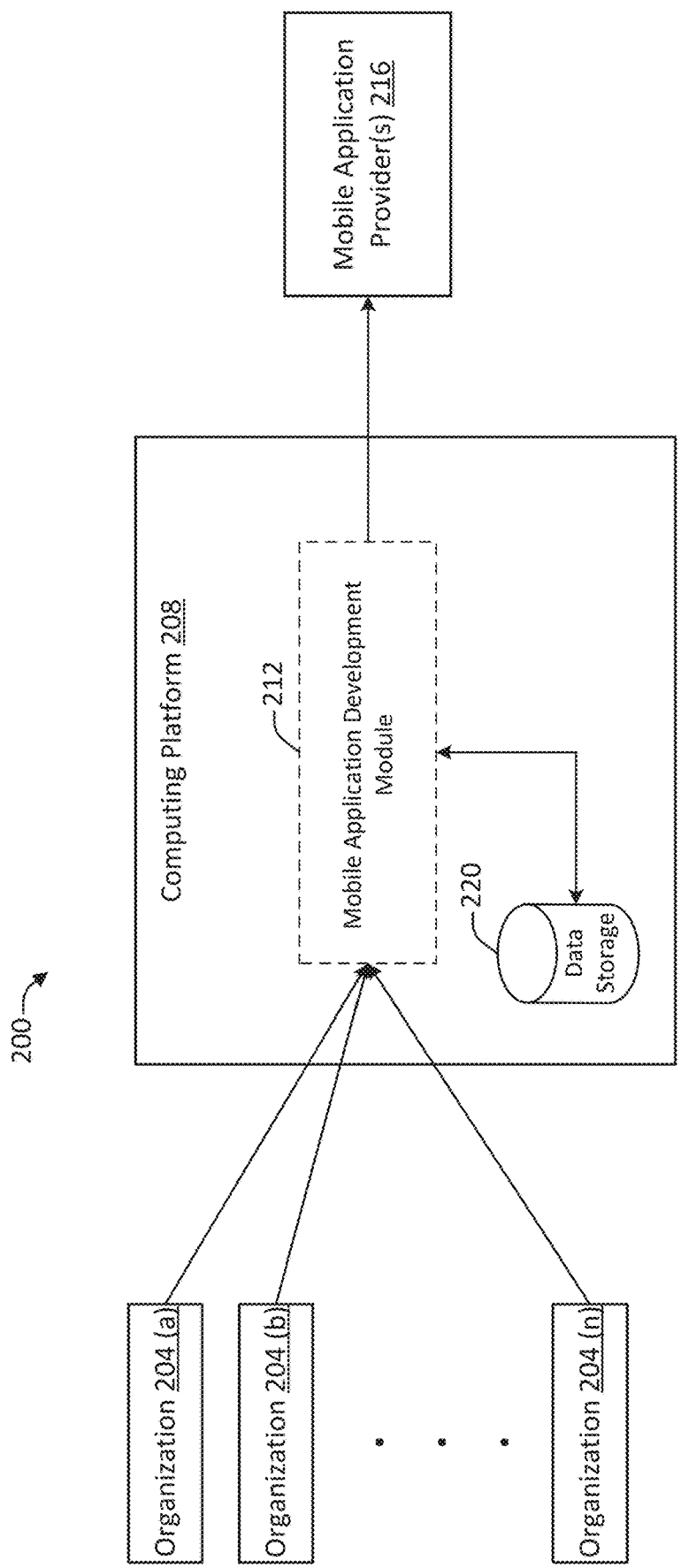
FIG. 2 shows a block diagram of an example of a mobile application development environment, in accordance with some implementations.
Figure 3:
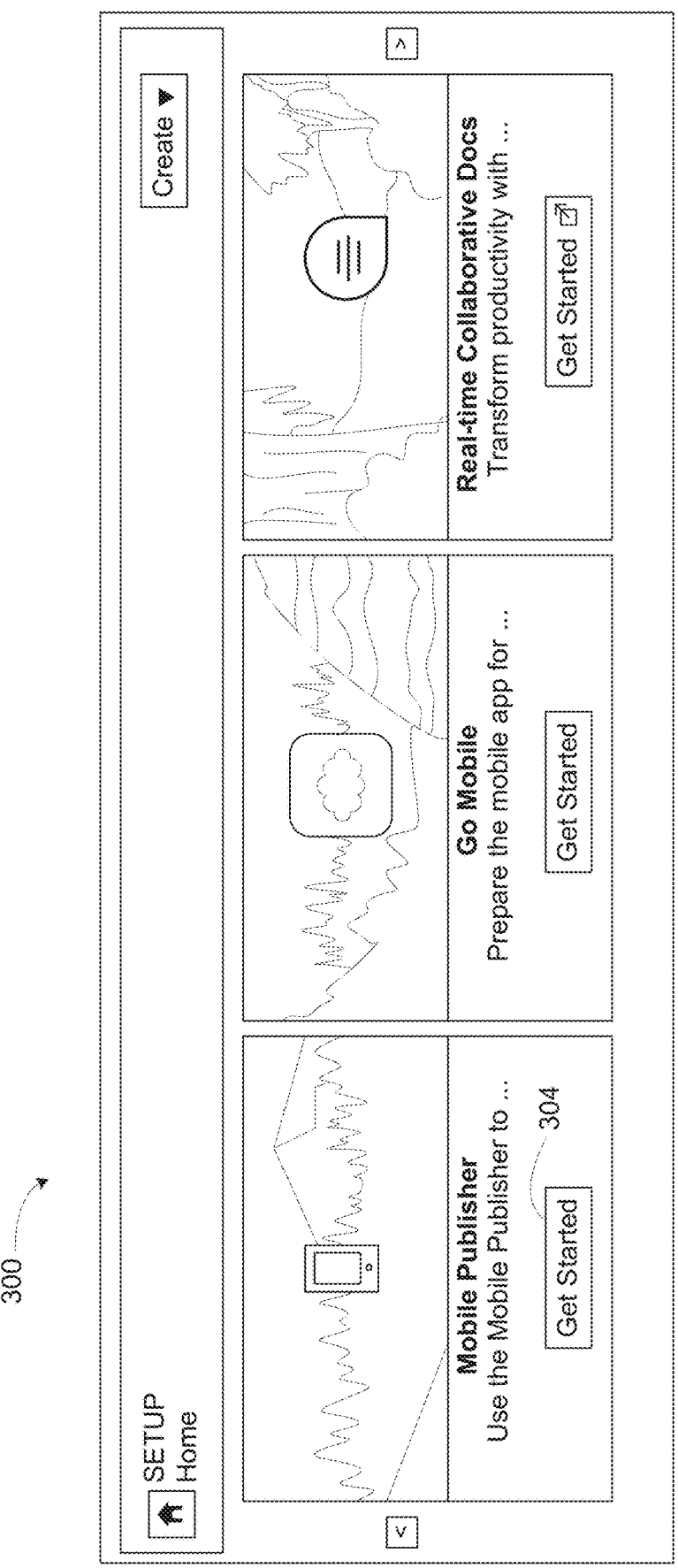
FIG. 3 shows an example of a Graphical User Interface (GUI), in accordance with some implementations.
Figure 6:
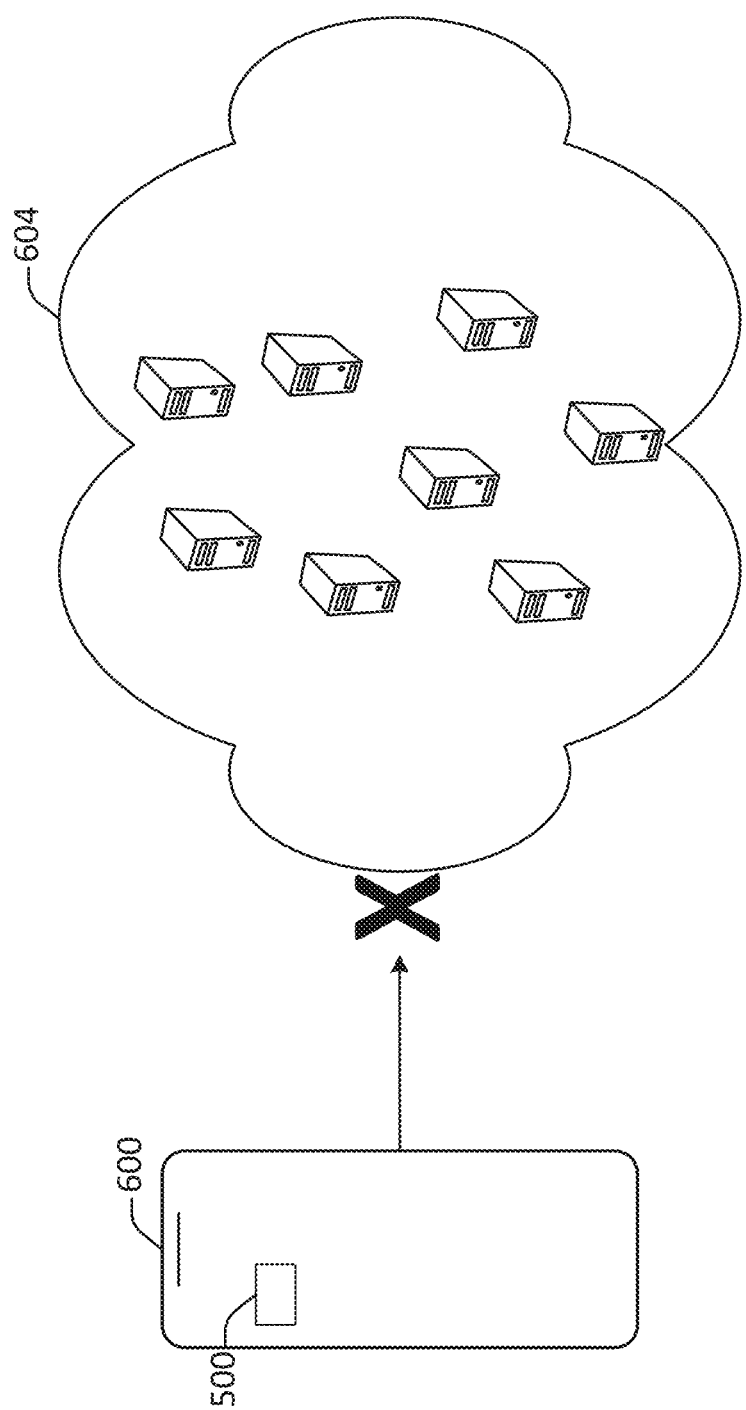
FIG. 6 shows a block diagram of an example of enforcement of mobile application security policy prior to run time, in accordance with some implementations.

FIG. 1 shows a flowchart of an example of a method for automatically integrating security policy in mobile applications at build-time, in accordance with some implementations. FIG. 1 is described in the context of FIGS. 2-5. FIG. 2 shows a block diagram of an example of a mobile application development environment, in accordance with some implementations. FIGS. 3-4 show examples of Graphical User Interfaces (GUIs), in accordance with some implementations. FIG. 5 shows a block diagram of an example of mobile application production during build-time, in accordance with some implementations. FIG. 6 shows a block diagram of an example of enforcement of mobile application security policy prior to run-time, in accordance with some implementations.

At 104 of FIG. 1, a mobile application development environment may be maintained. In some implementations, the mobile application development environment may be maintained in association with a computing platform. By way of example, in mobile application development environment 200 of FIG. 2, organizations 204 (*a*)-(*n*) interact with computing platform 208. As discussed above, the computing platform 208 may be any type of computing platform and may have a variety of components such as a Customer Relationship Management (CRM) Platform, a social networking system, any type of consumer or business software, etc.

The computing platform 208 includes a mobile application development module 212, which may perform the automated application production and/or deployment techniques disclosed herein. For instance, in some implementations, users affiliated with the organizations 204 (*a*)-(*n*) may request production of mobile application binaries. The mobile application development module 212 may process such requests to generate such binaries. By way of example, Mansfield Bank may use a CRM platform, such as one provided by Salesforce.com®, to host a "community," e.g., a branded space for its employees, customers, and partners to connect. The community may be designable and/or customizable by authorized users affiliated with Mansfield Bank. On behalf of Mansfield Bank, Fanny may request production of the Mansfield Bank mobile application binary. In response to Fanny's request, as discussed below, the mobile application development module 212 may access data stored in data storage 220 that defines the Mansfield Bank community such as information defining the content, design, and/or layout of the community. The mobile application development module may use this information, as well as any other information entered by Fanny, to produce the binary of the Mansfield Bank employee mobile application. For example, the mobile application development module 212 may use data stored in any of the data storage 220 to convert a web version of the Mansfield Bank employee community into a binary of a mobile application such that the mobile application has the same or similar content, design, and/or layout as the web version of the Mansfield Bank employee community.

In some implementations, users affiliated with the organizations 204 (*a*)-(*n*) may provide metadata to the mobile application development module 212. By way of example, on behalf of Mansfield Bank, Fanny may provide metadata to the mobile application development module 212 to define a Mansfield Bank mobile application. As described below, the mobile application development module 212 may process metadata to automatically produce mobile applications for organizations 204 (*a*)-(*n*) providing the metadata. Returning to the above example, the mobile application development module 212 to may process the metadata provided by Fanny to produce a Mansfield Bank mobile application.

In some implementations, the mobile application development module 212 may automatically provide mobile applications to mobile application provider(s) 216, which may be any provider capable of providing mobile applications such as the Apple® App Store, the Android® app store, etc. Returning to the above example, the mobile application development module 212 may then provide the Mansfield Bank mobile application Apple® app store.

In some implementations, the mobile application development module 212 may automatically provide ongoing maintenance and updates to features of mobile applications. Such maintenance and updates may be automatically performed without requiring users to provide additional metadata. By way of example, as compatibility requirements (e.g., with iOS® or Android®) change, the mobile application development module 212 may automatically update existing mobile applications (e.g., mobile applications that were developed in the mobile application development environment 200) using existing metadata to bring the mobile applications into compliance with the changing compatibility requirements. In another example, in response to new security updates being issued, the mobile application development module 212 may automatically update existing mobile applications using existing metadata.

In some implementations, the computing platform 208 may be provided to the organizations 204 (*a*)-(*n*) via an on-demand computing environment, as discussed further below in the context of FIGS. 7-9. By way of example, the computing platform 208 may be provided to the organizations 204 (*a*)-(*n*) in a multi-tenant database system, as described below. Similar to tenant data storage 722 of FIG. 7, data storage 220 of FIG. 2 may store data of the organizations 204 (*a*)-(*n*) in a multi-tenant architecture. The mobile application development module 212 may access the data storage 220 and use an organizations 204 (*a*)-(*n*) data when producing a mobile application. Similarly, the mobile application development module 212 may store metadata defining an organizations 204 (*a*)-(*n*) mobile application in the data storage 220. Returning to the above example, the mobile application development module 212 may access Mansfield Bank's data, which is stored in the data storage 220, when producing the Mansfield Bank mobile application. Once Fanny has provided metadata to define the Mansfield Bank mobile application, the mobile application development module 212 may cause the metadata to be stored in the data storage 220.

Returning to FIG. 1, in some implementations, at 108, a first request to produce a mobile application with a particular security policy may be received from a user of the computing platform. By way of illustration, returning to the above-described example, Fanny may navigate to home page 300 of FIG. 3. She may then click or tap "get started" button 304 to navigate to a mobile application development environment. Mobile application development environment home page 400 of FIG. 4 may be caused to be displayed on Fanny's computing device. From the home page 400, Fanny may delete or modify existing mobile applications 404 (*a*)-(*c*). From the home page 400, Fanny may also create a new mobile application by clicking or tapping "create new app" button 408. Once Fanny clicks or taps the create new app button 408, Fanny may be presented with a choice of mobile application types. Fanny may then choose a mobile application type from which the Mansfield Bank mobile application may be produced. Such types may encompass a wide range of potential mobile applications and may include any type of mobile application type provided by the computing platform 208 of FIG. 2. By way of example, as discussed above, Fanny may choose to make the Mansfield Bank mobile application based on a Salesforce® "Lightning Communities" mobile application type. Fanny may create and/or customize a Mansfield Bank employee community using a framework provided by the computing platform 208.

In some implementations, the mobile application development module 212 may produce Mansfield Bank mobile application 500 of FIG. 5 by processing community information 502 (which defines the Mansfield Bank employee community) in combination with a variety of other items provided by an authorized user of the computing platform affiliated with Mansfield Bank. Such items may include a variety of information provided by Mansfield Bank such as a security policy 504 specifiable by an authorized user of the computing platform affiliated with Mansfield Bank, customization parameters 508 specifiable by an authorized user of the computing platform affiliated with Mansfield Bank, Mansfield Bank's branding information 512, and/or additional defining metadata 516 provided by an authorized user of the computing platform affiliated with Mansfield Bank.

As discussed above, the security policy 504 may be customizable and may vary across implementations. For example, security policies may vary based on organizational needs. As discussed above, the computing platform 208 of FIG. 2 may be a CRM platform provided to a plurality of tenant organizations via an on-demand computing environment. The CRM platform may be provided to a wide variety of organizations such as banks, colleges and universities, stores, product brands, nonprofits, etc. For example, financial customers, such as Mansfield Bank may have high security needs. On the other hand, other organizations implementing the CRM platform may have relatively lower security needs. As such, financial customers, such as Mansfield Bank, may use the mobile application development environment 200 to produce mobile applications with relatively stricter security policies than those produced on behalf of other organizations.

The security policy 504 may be granular and may be used to mitigate a variety of security threats. For example, an authorized user of the computing platform affiliated with Mansfield Bank may specify the security policy 504 such that jailbroken devices, and/or devices that are operating on a compromised network may not run the Mansfield Bank mobile application 500. One having skill in the art can appreciate that the security policies described herein may extend beyond simply protecting against jailbroken devices, and/or devices that are operating on a compromised network. For example, such security policies may be specified to prevent devices with debuggers and/or anti-hook mechanisms in place, as well as any device with any type of hardware or software that may present a security threat, from running mobile applications produced using the methods described herein.

In some implementations, a default security policy may be provided to less sophisticated organizations and/or organizations that do not have specific security need. By way of example, such a default security policy may be enforceable to prevent jailbroken devices, and/or devices that are operating on a compromised network from running mobile applications produced using the methods described herein.

In some implementations, at 112 of FIG. 1, a second request to include customization parameters (e.g., customization parameters 508 of FIG. 5) in a mobile application (e.g., the Mansfield Bank mobile application 500 of FIG. 5) may be processed. Such customization parameters may vary across implementations and may include any points by which a mobile application may be customized. By way of example, customization parameters 508 of FIG. 5 may include specification of a minimum operating system (OS) version. For instance, Fanny may specify a customization parameter 508 such that only devices running Apple iOS 13 or Android OS 10 may run the Mansfield Bank mobile application 500.

Also or alternatively, customization parameters 508 of FIG. 5 may include specification of a particular virtual private network (VPN) client to be used in association with a mobile application. For example, some organizations may wish to use Cisco® VPN while others would like to use S5.

In some implementations, customization parameters 508 of FIG. 5 may include specification of a particular e-mail application and/or web browser that a mobile application uses by default. For instance, some organizations may wish to steer users of their mobile applications through a particular web browser such as Blackberry®, Safari®, Chrome® etc.

Also or alternatively, customization parameters 508 of FIG. 5 may include specification of a particular messaging procedure to be used by a mobile application. By way of example, some organizations may wish that their mobile applications utilize a specific messaging client such as Skype® messenger versus using regular phone dialer.

In some implementations, customization parameters 508 of FIG. 5 may include specification of a particular third party software development kit (SDK) to be integrated into a mobile application.

Also or alternatively, customization parameters 508 of FIG. 5 may also include specification of particular device components that a mobile application may access. By way of illustration, a developer of a particular mobile application may specify that the mobile application have access to a device's camera microphone, and files, but she may specify that the mobile application not receive access to device's location.

Many of the above-described examples of customization parameters cannot be configured at runtime; therefore, like the security policies discussed herein, customization parameters may also be integrated with mobile application during build-time.

Returning to FIG. 1, in some implementations, at 116, the mobile application (e.g. the Mansfield Bank mobile application 500 of FIG. 5) may be automatically produced. By way of illustration, responsive to processing the first request of 108 of FIG. 1, the Mobile Application Development Module 212 of FIG. 2 may produce the Mansfield Bank mobile application 500 of FIG. 5 using the techniques described above. The security policy 504 may be integrated with the Mansfield Bank mobile application 500 during creation of the Mansfield Bank mobile application 500, as discussed above. For example, all of the components of the Mansfield Bank mobile application 500 (including the security policy 504) may be compiled together and provided to a mobile application provider, as discussed below.

Returning to FIG. 1, in some implementations, at 120 the mobile application (e.g. the Mansfield Bank mobile application 500 of FIG. 5) may be provided to a mobile application provider. As discussed above, the security policy may be included in the mobile application when the mobile application is downloaded from the mobile application provider. By way of example, when Edmund downloads the Mansfield Bank mobile application 500 of FIG. 5 onto his smartphone 600 of FIG. 6, the security policy 504 of FIG. 5 is included.

Returning to FIG. 1, in some implementations, at 124 a third request from a computing device attempting to run the mobile application (e.g. the Mansfield Bank mobile application 500 of FIG. 5) may be processed. By way of example, in FIG. 6, Edmund taps an icon on his smartphone 600 to request initiation of the Mansfield Bank mobile application 500 of FIG. 5.

Returning to FIG. 1, in some implementations, at 128 the security policy may be enforced in response to the third request being processed at 124. By way of illustration, returning to the above example, upon processing Edmund's request to initiate the Mansfield Bank mobile application 500 of FIG. 5, Edmund's smartphone 600 of FIG. 6 may automatically enforce the security policy 504 of FIG. 5. The security policy 504 of FIG. 5 prevents jailbroken devices from communicating with the server system 604 of FIG. 6, which implements the Mansfield Bank employee mobile application 500 of FIG. 5. Since Edmund's smartphone 600 of FIG. 6 is a jailbroken device, Edmund's smartphone 600 will be prevented from communicating with the server system 604, averting the security threats described above.

One having skill in the art can appreciate that the disclosed techniques can be applied in the production of any type of mobile application and can be extended beyond the examples described above. For example, in some implementations, an independent service vendor (ISV) that is a third party to the computing platform may develop a mobile application template. The ISV may provide the mobile application template to the computing platform. The ISV may also define customization parameters for the mobile application template as described above. Since the computing platform may be a trusted and secure build and distribution platform, the computing platform may provide a framework for users to produce mobile applications based on the third party ISV's mobile application template using the disclosed techniques.

Figure 7:
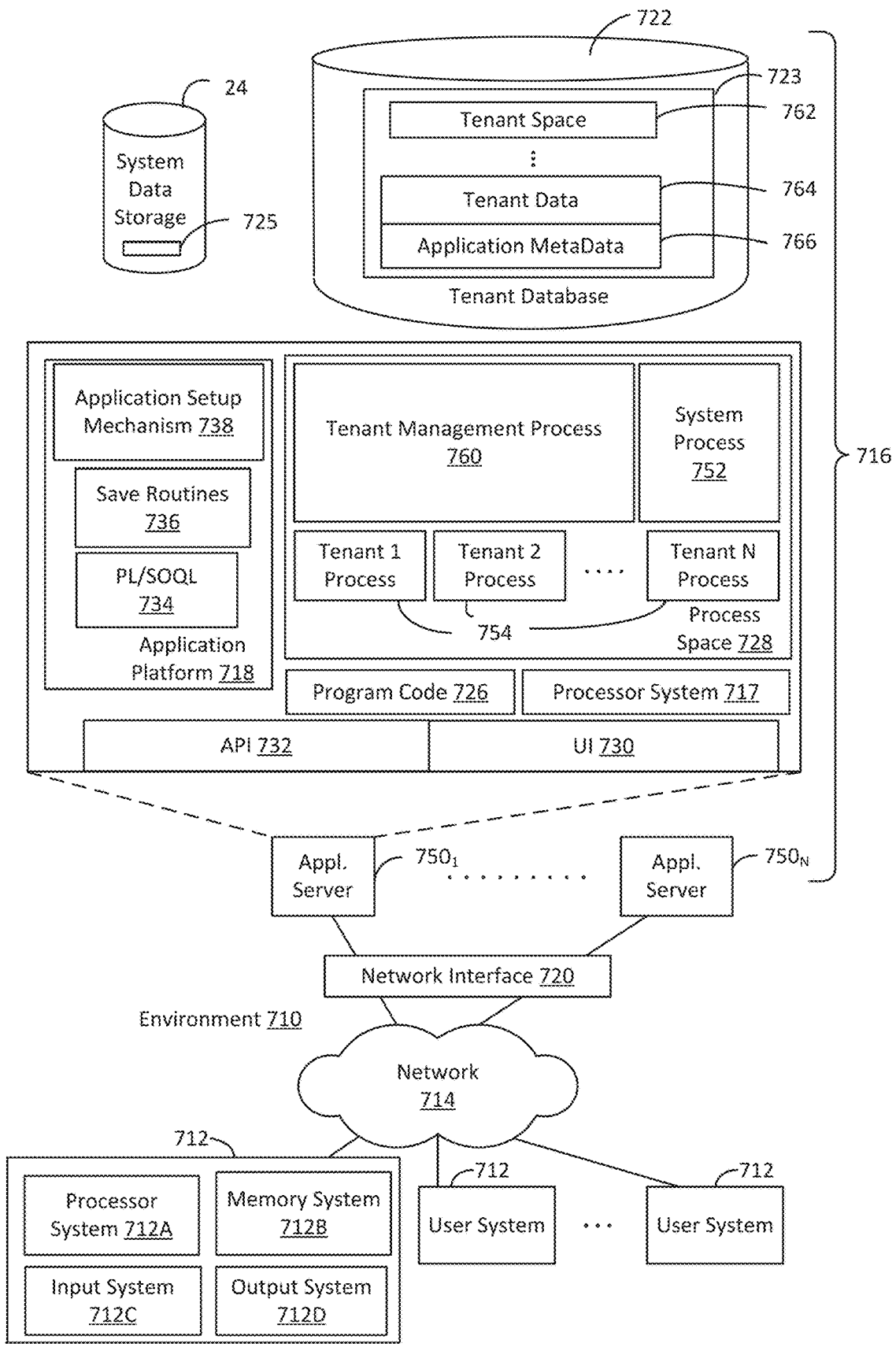
FIG. 7 shows a block diagram of an example of an environment that includes an on-demand database service configured in accordance with some implementations.

FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 750-1 through 750-N, system process space 752, tenant process spaces 754, tenant management process space 760, tenant storage space 762, user storage 764, and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based mobile application production and/or deployment system. For example, in some implementations, system 716 may include application servers configured to implement and execute a variety of software applications. The application servers may be configured to provide related data, code, forms, web pages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 712D. A user system 712 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as a mobile application production and/or deployment system, a social networking system, and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MTS arrangement. By way of example, one tenant organization may be a company that employs a sales force where each salesperson uses system 716 to manage their sales process. Thus, a user in such an organization may maintain contact data, leads data, customer follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MTS arrangement, system 716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 716 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 8A:
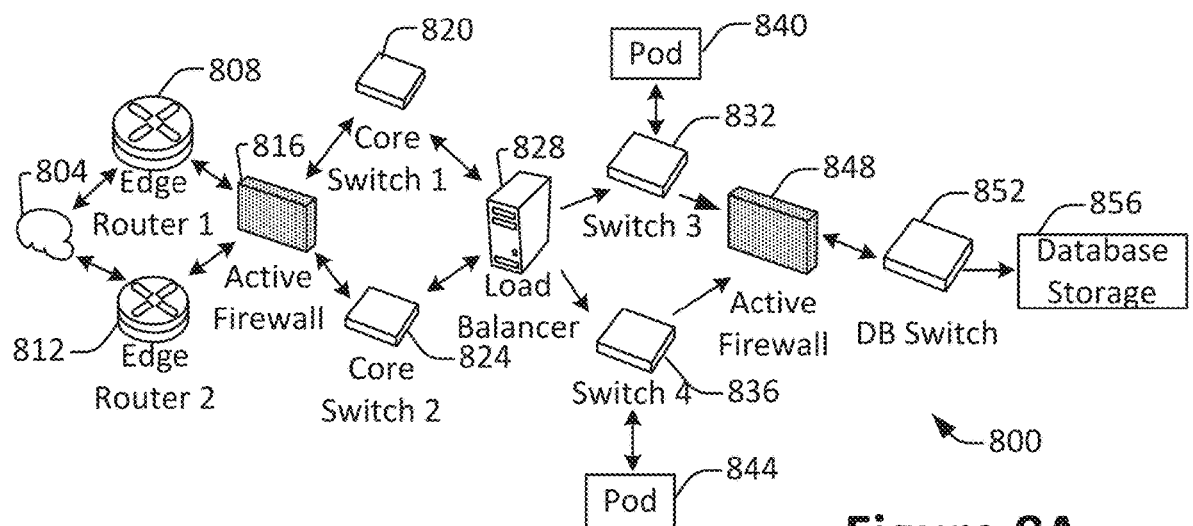
FIG. 8A shows a system diagram of an example of architectural components of an on-demand database service environment, configured in accordance with some implementations.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems 712 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process a variety of information.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the internet.

In one or more implementations, the firewall 816 may protect the inner components of the environment 800 from internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800. The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

Figure 8B:
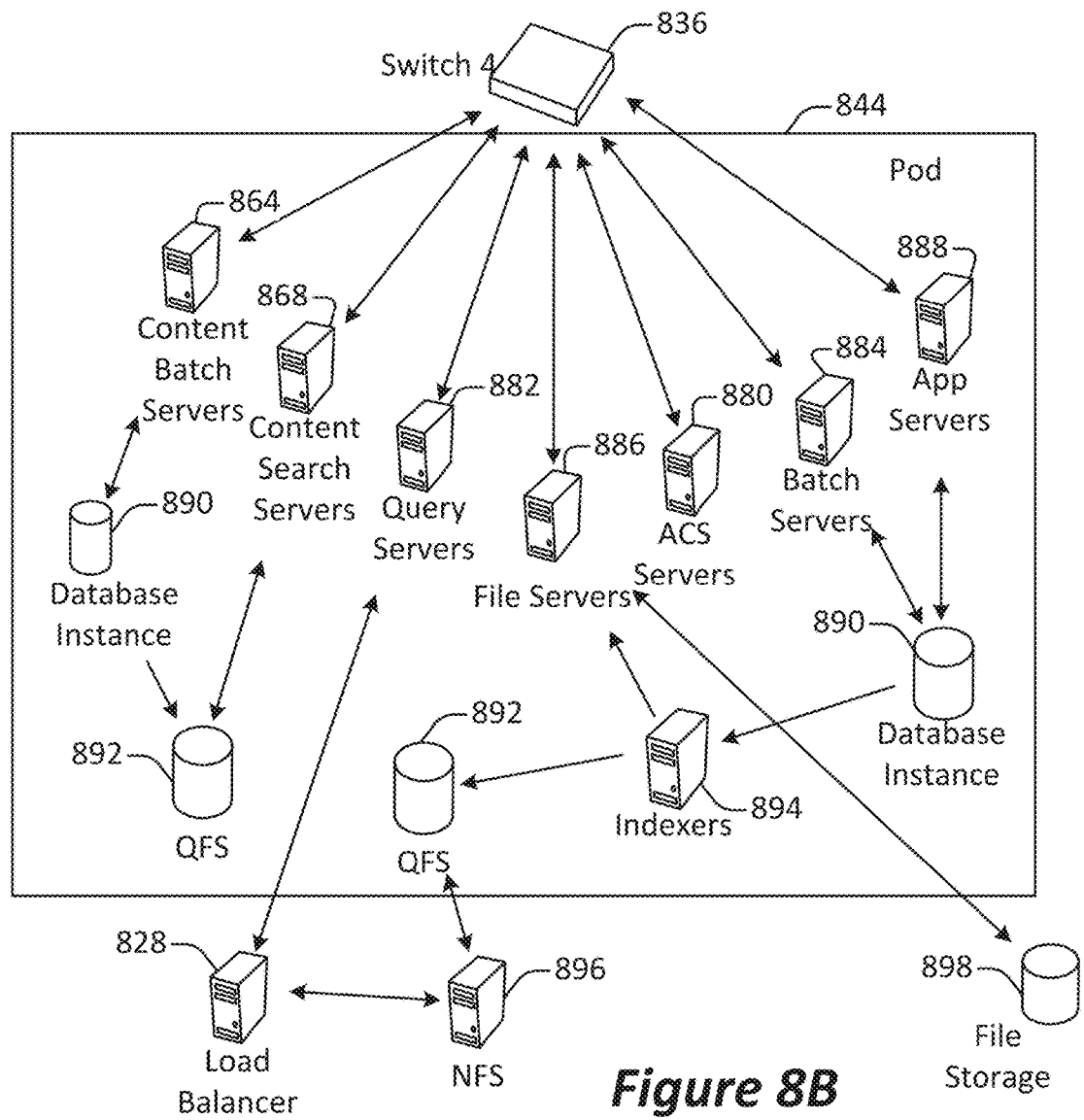
FIG. 8B shows a system diagram further illustrating an example of architectural components of an on-demand database service environment, in accordance with some implementations.

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBs), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 9:
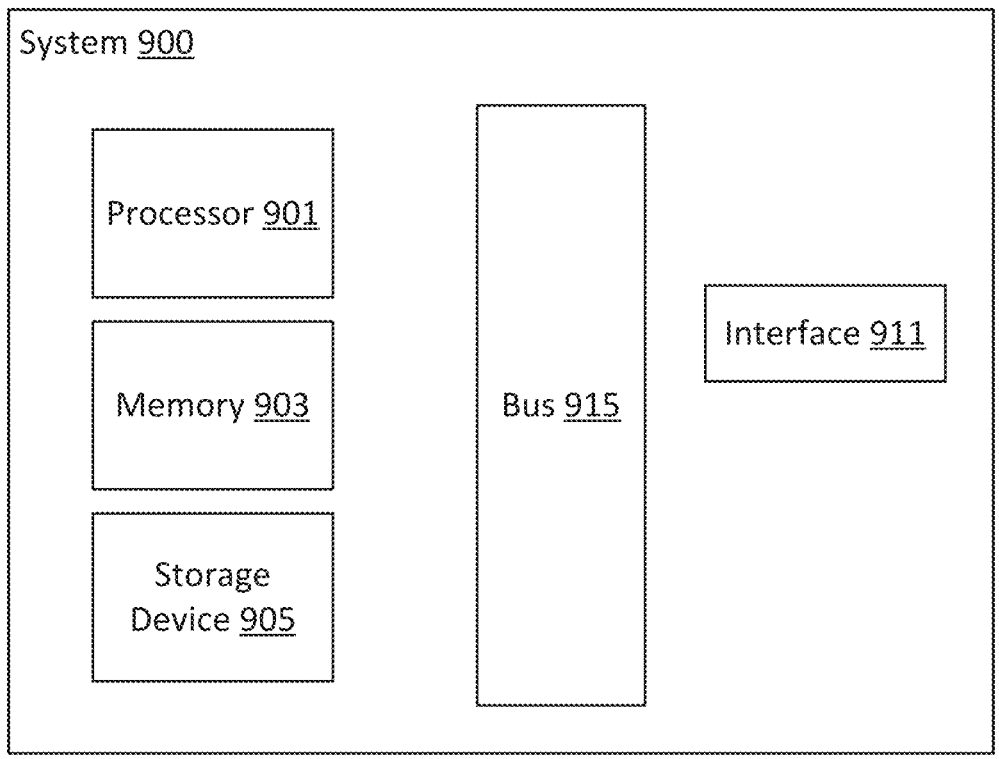
FIG. 9 illustrates one example of a computing device, configured in accordance with one or more embodiments.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as variety of devices such as an application server, a database server, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A computing system comprising:
one or more computer processors; and
a computer-readable storage medium comprising instructions for controlling the one or more computer processors to be configurable to cause:
maintaining a mobile application development environment associated with a computing platform, the mobile application development environment configurable to produce mobile applications based on information provided by users of the computing platform;
processing a first request, from a user of the computing platform, to produce a first mobile application with a first security policy, the first security policy being specifiable by the user;
automatically producing, responsive to processing the first request, the first mobile application, the first security policy being integrated with the first mobile application during creation of the first mobile application, wherein the first security policy is configured to determine when a second request to run the first mobile application is received and prevent the first mobile application from running and performing a communication with a server system that implements the first mobile application; and
providing the first mobile application to a mobile application provider, the first security policy being included in the first mobile application when the first mobile application is downloaded from the mobile application provider.

2. The computing system of claim 1, the computing system being further configurable to cause:
processing a third request, from the user of the computing platform, to include a plurality of customization parameters in the first mobile application; and
wherein the customization parameters are integrated with the first mobile application during creation of the first mobile application.

3. The computing system of claim 2, wherein the customization parameters include: specification of a minimum operating system (OS) version to run the first mobile application, specification of a default virtual private network (VPN) client to be used by the first mobile application, specification of a default e-mail application to be used by the first mobile application, specification of a default web browser to be used by the first mobile application, specification of a default messaging client to be used by the first mobile application, specification of a third party $3^{rd}$ party software development kit (SDK) to be integrated into the first mobile application, and or specification of device components to which the first mobile application has access.

4. The computing system of claim 1, wherein the first mobile application is configured to cause enforcement of the first security policy, responsive to processing the second request, to prevent a computing device from communicating with the server system.

5. The computing system of claim 4, wherein the first security policy prevents the communicating with the server system when the first security policy determines the computing device comprises a jailbroken device, the computing device is operating on a compromised network, and/or the computing device has debugger or anti-hook mechanisms in place.

6. The computing system of claim 1, wherein the computing platform comprises a customer relationship management (CRM) application provided to a plurality of tenant organizations via an on-demand computing environment, the user being affiliated with a first one of the tenant organizations.

7. The computing system of claim 6, wherein the first mobile application corresponds to a first one of the tenant organizations, and a second mobile application produced using the mobile application development environment has a second security policy corresponding to a second one of the tenant organizations, the second security policy being different from the first security policy.

8. The computing system of claim 1, wherein components of the first mobile application are compiled together with the first security policy to produce a binary of the first mobile application.

9. A method comprising:
maintaining a mobile application development environment associated with a computing platform, the mobile application development environment configurable to produce mobile applications based on information provided by users of the computing platform;
processing a first request, from a user of the computing platform, to produce a first mobile application with a first security policy, the first security policy being specifiable by the user;
automatically producing, responsive to processing the first request, the first mobile application, the first security policy being integrated with the first mobile application during creation of the first mobile application, wherein the first security policy is configured to determine when a second request to run the first mobile application is received and prevent the first mobile application from running and performing a communication with a server system that implements the first mobile application; and
providing the first mobile application to a mobile application provider, the first security policy being included in the first mobile application when the first mobile application is downloaded from the mobile application provider.

10. The method of claim 9, the method further comprising:
processing a third request, from the user of the computing platform, to include a plurality of customization parameters in the first mobile application; and
wherein the customization parameters are integrated with the first mobile application during creation of the first mobile application.

11. The method of claim 10, wherein the customization parameters include: specification of a minimum operating system (OS) version to run the first mobile application, specification of a default virtual private network (VPN) client to be used by the first mobile application, specification of a default e-mail application to be used by the first mobile application, specification of a default web browser to be used by the first mobile application, specification of a default messaging client to be used by the first mobile application, specification of a third party $3^{rd}$ party software development kit (SDK) to be integrated into the first mobile application, and or specification of device components to which the first mobile application has access.

12. The method of claim 9, wherein the first mobile application is configured to cause enforcement of the first security policy, responsive to processing the second request, to prevent a computing device from communicating with the server system.

13. The method of claim 12, wherein the first security policy prevents the communicating with the server system when the first security policy determines the computing device comprises a jailbroken device, the computing device is operating on a compromised network, and/or the computing device has debugger or anti-hook mechanisms in place.

14. The method of claim 9, wherein the computing platform comprises a customer relationship management (CRM) application provided to a plurality of tenant organizations via an on-demand computing environment, the user being affiliated with a first one of the tenant organizations.

15. The method of claim 14, wherein the first mobile application corresponds to a first one of the tenant organizations, and a second mobile application produced using the mobile application development environment has a second security policy corresponding to a second one of the tenant organizations, the second security policy being different from the first security policy.

16. A non-transitory computer-readable medium comprising computer-readable program code capable of being executed by one or more processors, the program code comprising instructions configurable to cause:
maintaining a mobile application development environment associated with a computing platform, the mobile application development environment configurable to produce mobile applications based on information provided by users of the computing platform;
processing a first request, from a user of the computing platform, to produce a first mobile application with a first security policy, the first security policy being specifiable by the user;
automatically producing, responsive to processing the first request, the first mobile application, the first security policy being integrated with the first mobile application during creation of the first mobile application, wherein the first security policy is configured to determine when a second request to run the first mobile application is received and prevent the first mobile application from running and performing a communication with a server system that implements the first mobile application; and
providing the first mobile application to a mobile application provider, the first security policy being included in the first mobile application when the first mobile application is downloaded from the mobile application provider.

17. The non-transitory computer-readable medium of claim 16, the instructions being further configurable to cause:
processing a third request, from the user of the computing platform, to include a plurality of customization parameters in the first mobile application; and
wherein the customization parameters are integrated with the first mobile application during creation of the first mobile application.

18. The non-transitory computer-readable medium of claim 17, wherein the customization parameters include: specification of a minimum operating system (OS) version to run the first mobile application, specification of a default virtual private network (VPN) client to be used by the first mobile application, specification of a default e-mail application to be used by the first mobile application, specification of a default web browser to be used by the first mobile application, specification of a default messaging client to be used by the first mobile application, specification of a third party 3rd party software development kit (SDK) to be integrated into the first mobile application, and or specification of device components to which the first mobile application has access.

19. The non-transitory computer-readable medium of claim 16, wherein the first mobile application is configured to cause enforcement of the first security policy, responsive to processing the second request, to prevent a computing device from communicating with the server system.

20. The non-transitory computer-readable medium of claim 19, wherein the first security policy prevents the communicating with the server system when the first security policy determines the computing device comprises a jailbroken device, the computing device is operating on a compromised network, and/or the computing device has debugger or anti-hook mechanisms in place.

21. The non-transitory computer-readable medium of claim 16, wherein the computing platform comprises a customer relationship management (CRM) application provided to a plurality of tenant organizations via an on-demand computing environment, the user being affiliated with a first one of the tenant organizations.

* * * * *